United States Patent
Sorensen et al.

(10) Patent No.: US 7,729,664 B2
(45) Date of Patent: Jun. 1, 2010

(54) TECHNIQUE FOR REDUCING INTERFERENCE TO RADIO OPERATIONS ON A COMPUTING DEVICE

(75) Inventors: Robert Sorensen, Fremont, CA (US); Jerome Tu, Saratoga, CA (US)

(73) Assignee: Palm, Inc., Sunnyvale, CA (US)

( * ) Notice: Subject to any disclaimer, the term of this patent is extended or adjusted under 35 U.S.C. 154(b) by 747 days.

(21) Appl. No.: 11/408,152

(22) Filed: Apr. 20, 2006

(65) Prior Publication Data
US 2007/0249315 A1     Oct. 25, 2007

(51) Int. Cl.
*H04B 17/00*     (2006.01)
(52) U.S. Cl. .................. 455/67.13; 455/574; 455/41.2; 455/575.1; 455/283; 455/306; 455/296; 455/298; 455/556.1; 455/566; 455/550.1; 455/343.1; 370/318; 370/332; 379/433.01; 235/472.02; 700/299; 700/300; 713/300; 381/318; 381/94.1
(58) Field of Classification Search .................. 455/574, 455/41.2, 575.1, 283, 306, 296, 298, 556.1, 455/566, 550.1, 343.1; 370/318, 332; 379/433.01; 235/472.02; 700/299, 300; 713/300; 381/318, 381/94.1
See application file for complete search history.

(56) References Cited

U.S. PATENT DOCUMENTS

| | | | | |
|---|---|---|---|---|
| 7,243,851 B2* | 7/2007 | Zhu et al. | ............... | 235/472.02 |
| 7,363,063 B2* | 4/2008 | Zhu et al. | ................. | 455/575.1 |
| 7,412,306 B2* | 8/2008 | Katoh et al. | ................ | 700/299 |
| 2003/0177402 A1* | 9/2003 | Piazza | ........................ | 713/300 |
| 2005/0003793 A1 | 1/2005 | Goris et al. | | |
| 2006/0046770 A1 | 3/2006 | Zhu et al. | | |
| 2006/0050661 A1* | 3/2006 | Shim et al. | ................... | 370/318 |
| 2006/0058058 A1 | 3/2006 | Zhu et al. | | |
| 2006/0116178 A1* | 6/2006 | Vuong et al. | ................. | 455/574 |
| 2007/0135162 A1* | 6/2007 | Banerjea et al. | .......... | 455/556.1 |
| 2007/0249315 A1* | 10/2007 | Sorensen et al. | ............ | 455/298 |
| 2008/0008313 A1* | 1/2008 | Fyke | ..................... | 379/433.01 |

FOREIGN PATENT DOCUMENTS

EP     1662358 A1     5/2006
EP     1662763 A1     5/2006

OTHER PUBLICATIONS

International Search Report and Written Opinion of the U.S. International Searching Authority (ISA/US) for PCT/US07/66879, Sep. 15, 2008 (PALM.P949WO), 14 pages.
International Preliminary Report on Patentability of the U.S. International Searching Authority (ISA/US) for PCT/US07/066879, mailed Oct. 30, 2008 (PALM.P949WO), 8 pages.

* cited by examiner

*Primary Examiner*—Matthew D Anderson
*Assistant Examiner*—April G Gonzales
(74) *Attorney, Agent, or Firm*—Mahamedi Paradice Kreisman LLP (57) ABSTRACT

During a telephony session, a determination is made on a mobile computing device that one or more designated conditions exist by which radio interference generated from the mobile computing device is to be reduced. In response, a power state of a set of one or more components of the mobile computing device is lowered. This reduces radio interference from those components. The set of components are ancillary to the mobile computing device's ability to maintain the telephony session, so that the telephony session is not affected by the reduction of power to the components.

16 Claims, 4 Drawing Sheets

TECHNIQUE FOR REDUCING INTERFERENCE TO RADIO OPERATIONS ON A COMPUTING DEVICE

TECHNICAL FIELD

The disclosed embodiments relate generally to the field of wireless, radio-frequency communications. More particularly, embodiments described herein relate to a technique of reducing interference to radio operations on a computing device.

BACKGROUND

Communication devices have evolved to include numerous types of communication capabilities and functionality. For example, there are an increasingly large number of devices that operate as multi-functional cellular phones. Such devices are capable of executing relatively sophisticated applications, even when the device is in use as a cellular phone. These devices often provide rich displays, cameras, video recorders, music playback and other functionality.

While the added functionality of such devices is beneficial, one core use of cellular devices is typically its use as a cellular telephone.

DETAILED DESCRIPTION

On a mobile computing device, electrically generated radio interference (sometimes called "noise") can disturb wireless communications, particularly cellular telephone calls that transmit and receive voice data. Such noise is at least partially the result of components on the mobile computing device. With advances in the functionality provided on such mobile computing devices, disruptive interference can cause the device to drop a call or reduce the signal quality of the telephone call. Accordingly, embodiments described herein provide different mechanisms by which disruptive interference from operation of various, ancillary components and processes can be reduced. In particular, one or more embodiments provide for reducing the power state of components that are ancillary to a telephone call or other communication session on a mobile computing device in order to reduce the overall radio interference generated from the device.

Embodiments described herein provide for operating a mobile computing device during a telephony session conducted over a radio-frequency medium, such as through cellular networks. During a telephony session, a determination may be made on the computing device that one or more designated conditions exist by which radio interference generated from the mobile computing device is to be reduced. In response, a power state of a set of one or more components of the mobile computing device is lowered, in order to reduce radio interference from those components. The set of components are ancillary to the mobile computing device's ability to maintain the telephony session.

One affect that can be achieved by reducing radio interference or noise is that the signal attributes needed for maintaining a wireless communications session, and in particular, a telephony session, are improved. In particular, signal quality, including the amount of errors that occur in a transmission, are improved.

In one embodiment, individual components in the set of ancillary components are switched to an off state. However, another embodiment provides that one or more components in the set may have their power levels reduced, but not switched off. For example, a display may be dimmed, but not turned off. Likewise, an input/output device may be made inactive, but responsive.

As used herein, a component is "ancillary" if it is not needed for a stated purpose or task. For example, a component is ancillary to a wireless communication session or telephone call if the component is not needed for the communication session or call.

In addition, one or more embodiments are provided for use with portable computing devices. Portable computing devices include mobile computing devices with radio-frequency communication capabilities, such as cellular phone and messaging devices, or hybrid/multifunction devices that have cellular communication capabilities. Other examples of portable computing devices include personal digital assistants, laptop computers, and small-form factor computing devices that can provided added functionality such as messaging, word processing, media playback devices, global positioning system (GPS) devices, and fully functioning computers.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using modules. A module may include a program, a subroutine, a portion of a program, or a software component or a hardware component capable of performing one or more stated tasks or functions. As used herein, a module can exist on a hardware component independently of other modules, or a module can be a shared element or process of other modules, programs or machines.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor (s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

System Overview

Figure 1:
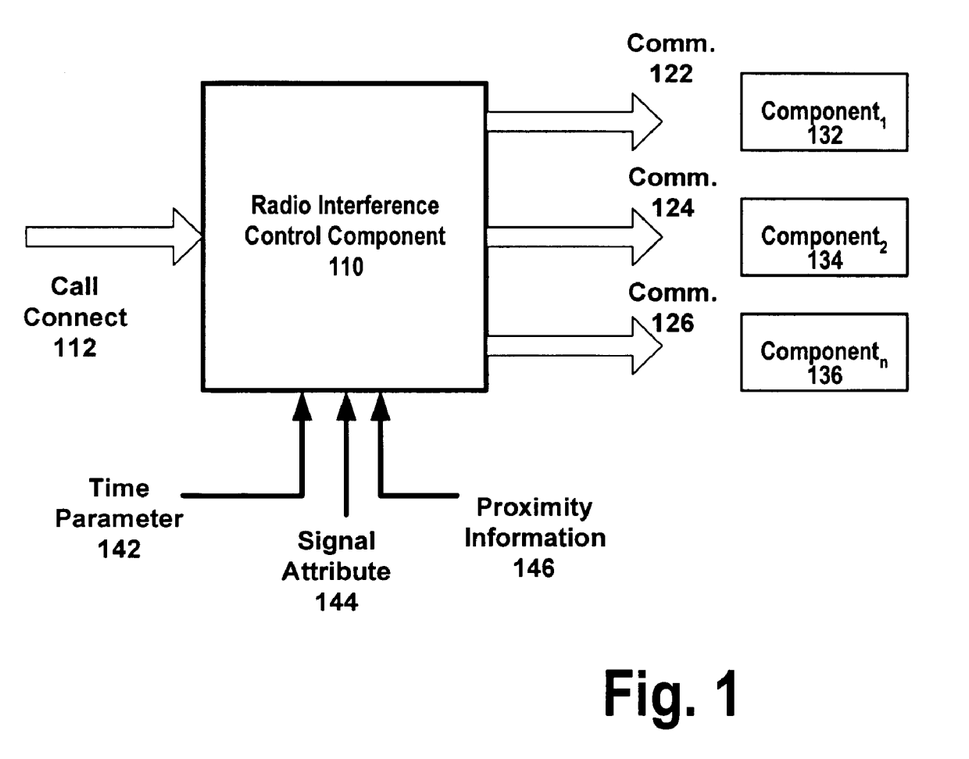
FIG. 1 is a block diagram illustrating implementation of a radio interference reduction state, according to an embodiment of the invention.

FIG. 1 is a block diagram illustrating implementation of a radio interference reduction state, according to an embodiment of the invention. In FIG. 1, a radio interference control component (RICC) 110 is provided on a mobile computing device for purpose of reducing radio interference when the mobile computing device is on a telephone call. The RICC 110 may be implemented as a software or programmatic component that executes on a processor of the mobile computing device. Alternatively, it is also possible for RICC 110 to be implemented through hardware or firmware.

The RICC 110 receives information about the use of the device, particularly with regard to wireless communications. Accordingly, RICC 110 may receive call connect information 112, indicating that the mobile computing device is on an active, telephone call using a radio-frequency medium. In one embodiment, the radio-frequency medium is cellular, but alternative embodiments contemplate a device that uses other radio-frequency mediums.

The RICC 110 includes logic that makes a determination as to whether the state of radio interference reduction is needed. This determination may be made through various mechanisms and processes, depending on implementation or design. Once the determination is made to implement the state, the RICC 110 issues one or more commands 122, 124 and 126. The commands 122-126 may be directed to and/or received by one or more corresponding components 132, 134, 136. In an embodiment, the effect of the commands 122-126 is that the corresponding components are switched to a low or non-operational power state, so as to reduce the radio interference generated from those components. In one implementation, the one or more corresponding components 132-136 may be switched to an off state. An off state of a component may correspond to the lowest power state from which the component can still be made operational with a change of state command. Thus, it may be possible for some components to still be active or responsive when in an off state (e.g. a contact-sensitive display that is off can still be switched on).

When ancillary components 132-136 are switched off or to a lower power state, radio interference may be reduced. Once effect of reducing radio interference is that the signal quality of the radio-frequency communication session may be improved. Signal quality is a parameter that is based on the amount of error that occurs in a transmission. Error correction is typically employed with incoming digital transmissions. Error correction results in identification of error bits, as well as information bits which form the communication. A relatively high signal quality has a lesser proportion of error bits, while a low signal quality has high proportion of error bits.

In order to implement the radio reduction state, one or more embodiments provide that RICC 110 reduces, or switches off, the power state of all components not needed for the communication session. In another embodiment, RICC 110 selects what components are to be switched off or placed in a low-power, based on prior designation or knowledge of which components to effect with commands 122-126. As examples, RICC 110 may switch a display off, or lower its brightness. As another example, RICC 110 may disable a backlight for a keyboard or display, touchpad, or handwriting recognition pad.

Still further, an embodiment may provide for RICC 110 to use a staggered approach to switching off the power states of the various components. If the determination is made that the radio reduction state is to be implemented at a time to, then at that time, the RICC 110 may switch off only a portion of the overall components it can switch off to reduce radio interference. The components selected at $t_0$ may be based on prior knowledge, or the selection may be made as an on-the-fly determination. Subsequently at a time $t_1$, another component or components may switched off or to a lower state. With this staggered approach, the computing device preserves some ancillary functionality. Whether or not RICC 110 uses the staggered approach, or switches all ancillary components at once, may depend on factors such as: (i) whether a particular ancillary component is in use or likely to be needed (e.g. if the user has a contact record open, the display may be left on, to allow the user to select a second number for a conference call), (ii) a determination as to the amount of radio interference reduction that is actually needed. In the latter case, the RICC 110 may determine that only slight improvement is needed to, for example, signal quality, and as such, does not switch all ancillary components at the start.

Figure 4:
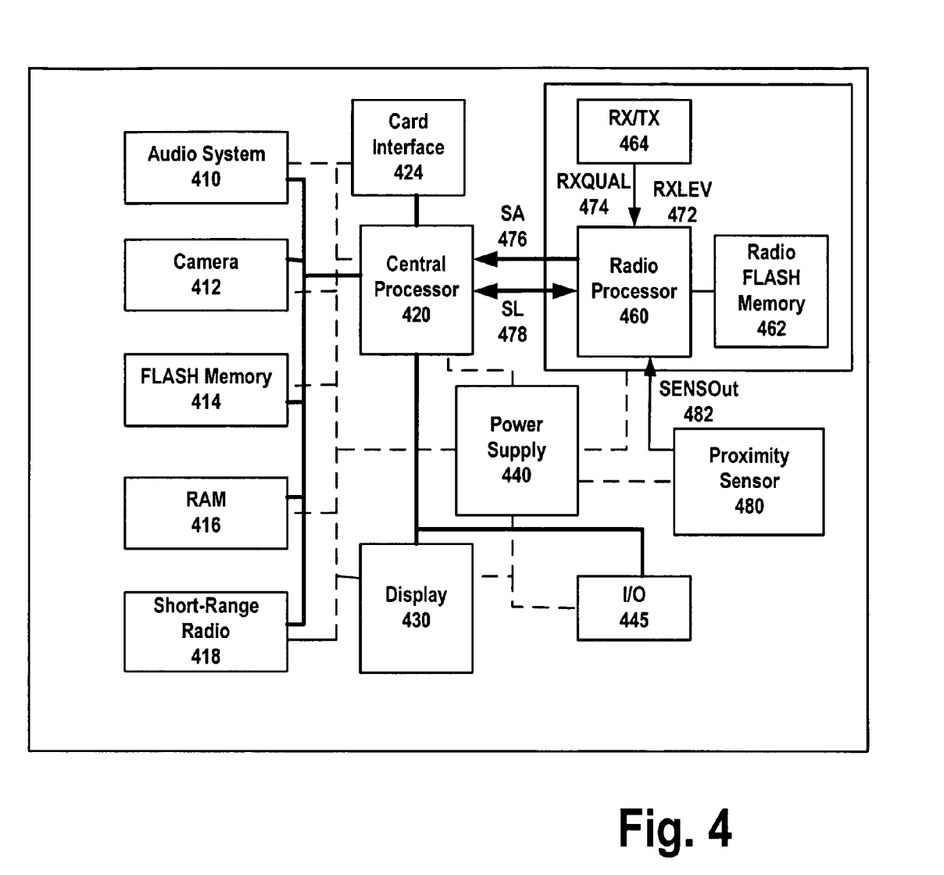
FIG. 4 illustrates a hardware diagram of a mobile computing device configured according to an embodiment of the invention.

According to one embodiment such as illustrated by FIG. 4, RICC 110 may be implemented on a device having a dual processor architecture for enabling cellular communications in connection with non-cellular functionality (e.g. such as word processing and image/video capturing). In such an architecture, RICC 110 may be executed on a central processor 420 that communicates with the radio processor 460, or alternatively on the radio processor 460 which communicates with the central processor 420 and/or other components. When executed from either processor, one implementation provides that RICC 110 may switch off (or switch to a low operational state) some or all of the central processor 420. This indirectly results in components such as display 430 or camera 412 from becoming non-operational.

In one embodiment, the RICC 110 determines whether radio interference reduction is needed through use of a timing parameter 142. If, for example, the telephone call extends beyond a designated duration of time, the RICC 110 implements the radio interference control. For example, if an active cellular call lasts more than ten seconds, radio interference control is implemented. The use of timing parameter 142 illustrates that the RICC 110 makes a "dumb" determination as to whether radio interference control is needed. The RICC 110 simply assumes radio interference control is needed based on a factor that is independent of whether radio interference reduction is needed, such as the passage of time.

In another embodiment, the RICC 110 determines whether radio interference control is needed by evaluating attributes 144 of a wireless signal used for the telephone call or wireless communication session. In one embodiment, the radio-frequency medium is cellular, and the attributes 144 correspond to signal strength and/or signal quality. In one embodiment, degradation or low signal quality triggers RICC 110 to implement radio interference control. In another embodiment, a combination of signal quality and signal strength trigger the RICC 110. Still further, numerous other signal attributes may be used. For example, on Code Division Multiple Access (CDMA) cellular networks, signal to noise ratio is a signal attribute in use, where the noise ration is a ratio of energy per bit (Eb) over noise (No), or in expression form: (Eb/No.). On Voice Over Internet Protocol (VoIP) communications, signal attributes may correspond to measurements or determinations of jitter and packet loss.

Signal quality can serve as a marker for when noise interference is disruptive. Low signal quality may arise when there is low signal strength, and signal strength is often independent of any radio interference. There may also be low signal quality when there is relatively high signal strength, as a result of various different factors. But the presence of high signal strength with low signal quality also provides an indication that implementation of radio interference control is more likely to improve the signal quality. One embodiment may provide for RICC 110 to implement radio interference control whenever the signal quality is low, on the basis that reduction of noise can only improve the signal quality when such improvement is needed. However, another embodiment provides that the RICC 110 implements radio interference control whenever signal quality is low, and signal strength is moderate or high, as this case is more likely to provide improvement in signal quality. Still further, another embodiment provides that RICC 110 implements radio-interference control based on a measurement of the attribute 144 over time. For example, if signal quality degrades over a designated duration, RICC 110 may be configured to determine that radio interference control is needed, even if the signal quality is still better than a marginal amount.

Furthermore, numerous variations and combinations to how signal attributes can be used are possible. For example, radio interference control may be implemented in certain cases where signal quality is mediocre or low, and signal strength is high. With such embodiments, the RICC 110 may use the attributes 144 to make an intelligent determination as to whether radio interference control is needed.

Another embodiment provides for the use of a proximity determination 146 to determine whether radio interference control is needed. The proximity determination 146 may be made through, for example, the use of a proximity sensor (e.g. proximity sensor 180, described with FIG. 4). In an embodiment in which the mobile computing device can be used to connect a telephone call, the value of the proximity sensor may be used as a marker to determine the position of the mobile computing device. The position of the mobile computing device enables a determination as to whether the user has need for the components 132-136 that are affected by the radio interference control. If, for example, the proximity value 146 indicates the mobile computing device is positioned close to the user's body, the inference may be that the device is against the user's face. When against the face, the user has less need for components 132-136, such as the display or application processor.

An embodiment provides that the RICC 110 implements a radio interference reduction state through use of two or more of the timing parameter 142, wireless signal attributes 144, or proximity value 146. For example, the RICC 110 may implement radio interference control when (i) the timing parameter 142 indicates the telephone call has exceeded a designated duration, and (ii) when the signal attribute 144 indicates degradation of signal quality, or alternatively, just a low signal quality value.

Once implemented, radio interference reduction can be discontinued or lessened with the occurrence of certain events. These may include call termination, user-override, other programmatic determinations that indicate the radio interference reduction is not needed, and sensor information. In one embodiment, a condition that resulted in RICC 110 to issue commands 122-126 may cease. For example, the signal attributes 144 may regain value, or the proximity input 146 may indicate placement of the device away from the user. In such an embodiment, RICC 110 may implement complimentary commands (not shown) to return some or all of the components 132-136 to the power state before the radio interference control was implemented.

In another embodiment, the radio interference reduction state is reversible when the telephone call or session ends, or if the user enters input to override the control. For example, if timing parameter 142 is used as the sole input for implementing radio interference reduction, the RICC 110 has no way of making the determination as to whether the radio interface reduction is needed later in the session. Absent such knowledge, RICC 110 may simply maintain the state of components 132-136, unless (i) the telephony session ends, or (ii) the user enters input (e.g. key press or screen tap) that causes an overrides of the state of one or more of the components 132-136. However, a combination of parameters may also be used to determine if radio interference reduction should be implemented or reduced/removed. For example, timing parameter 142 may be used to trigger the radio interference reduction, but the radio interference reduction may be eliminated by a processor of the computing device measuring signal attributes 144 for a criteria corresponding to elimination of the radio interference reduction. The processor can make such measurements and determinations even when switched "off".

Figure 3:
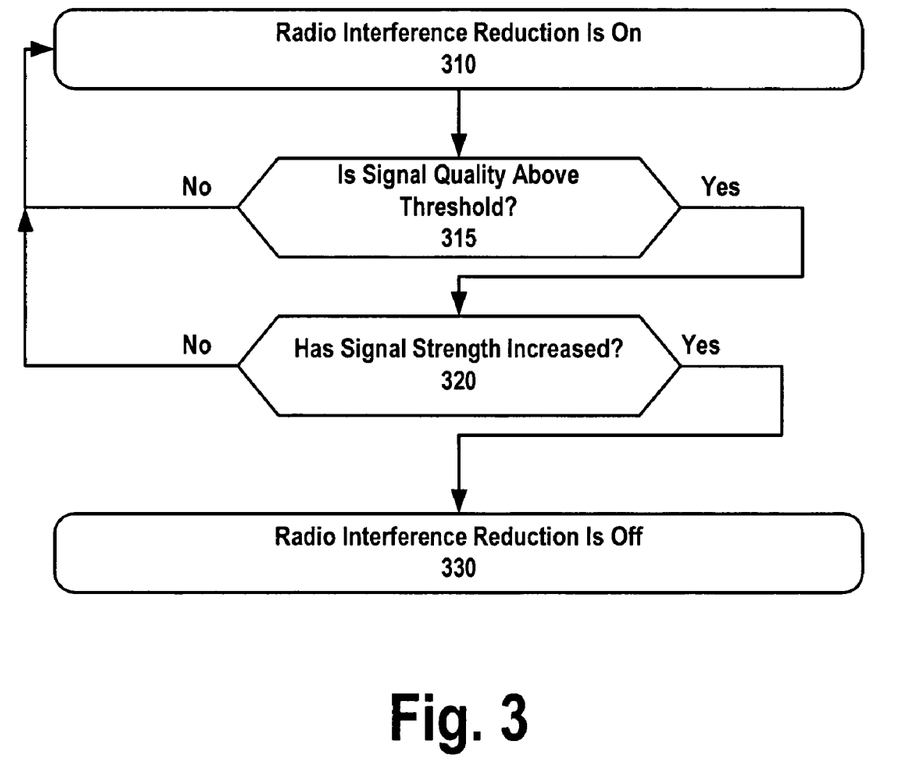
FIG. 3 illustrates a method in which radio interference reduction may be eliminated or lessened, based on a criteria established from signal attributes according to an embodiment of the invention.

In the case where signal attributes 144 are used, RICC 110 may be configured to recognize improvement in attributes as a result of issuing commands 122-126. An embodiment such as shown with FIG. 3 illustrates an algorithm which can be used to determine when radio interference reduction can be discontinued or lessened during an ongoing telephony session.

Methodology

Figure 2:
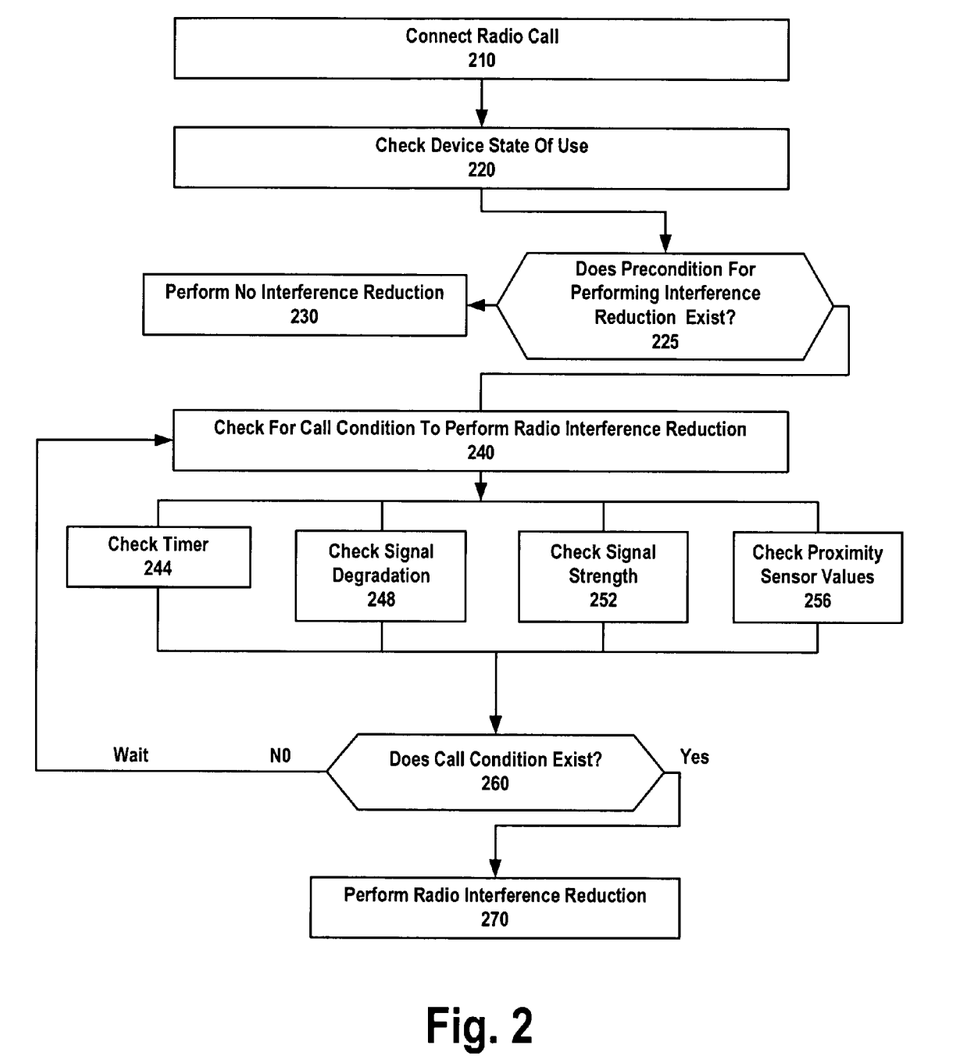
FIG. 2 illustrates one or more methods by which radio interference control or reduction may be implemented in connection with a radio-frequency communication session, according to embodiments of the invention.

FIG. 2 illustrates one or more methods by which radio interference control or reduction may be implemented in connection with a radio-frequency telephony session, according to embodiments of the invention. A method such as described with FIG. 2 may be implemented on a mobile computing device, such as one with cellular telephony capabilities. In such a device, the presence of components such as a digital camera or video recorder, backlighting, color display, active touchpad or display, extra memory, and rich media player all contribute radio interference. As described elsewhere, radio interference may affect a telephony session, particularly with its effects on the signal quality.

With reference to FIG. 2, step 210 provides that a telephony session is established on the mobile computing device through use of a cellular or other radio-frequency medium. This may correspond to a call being placed from the mobile computing device, followed by a call-pickup on the other end of the line. The call may also be established by an incoming call being received and connected from the mobile computing device.

According to one embodiment, a step 220 provides that designated attributes of the device's state of use are checked and/or monitored, sometime after the call is established on the mobile computing device. The designated attributes that are checked may depend on design and implementation. In an embodiment, the designated attributes are indicative of how the user is using the mobile computing device, including the position of the mobile computing device relative to the user. Specifically, in one embodiment, certain attributes about the device's state of use indicate that the computing device is or is not being held close to the user, so as to further indicate whether the user has need for functions that are ancillary to its telephony operations. Other attributes may be predictive of whether the user will want to use ancillary functions when the telephony session is ongoing. Embodiments described below provide that the attributes checked include the audio output state of the device, and more specifically, whether headset (Bluetooth or wireline connection) or speakerphone are in use. However, numerous other attributes may be considered, including applications that are open or running (e.g. if the user has a contact lookup application open, the application may remain operable as it indicates the user may wish to call more people), or past behavior of the user (e.g. the user has heavy and recent use of the camera, so the camera function must not be turned off).

In step 225, a determination is made as to whether radio interference control should be enabled. The determination may be based on a precondition, set by a criteria formed by the designated attributes that are determined in step 220. For example, in step 220, an audio output mode of the computing device is checked. In step 225, the determination may be based on whether the user is using a headset (short-range wireless such as Bluetooth or wireline connected) or whether user has a speakerphone function on. If the user has a headset on, or has the speakerphone on during an active call, the indication is that the user is separated from the mobile computing device. As such, the precondition may not exist because the user may have need for its screen, application processor, touchpad etc. If the user has no headset, and is not using the speakerphone, the precondition may be deemed to exist, as the attributes of the state of use indicate that the user has the device pressed against his face. As such, the user has no need for radio interference control.

Accordingly, if the determination in step 225 is that the precondition for implementing radio interference control does not exist, then step 230 provides that the mobile computing device is set to perform no interference reduction control while the active call takes place. If the determination in step 225 is that the precondition does exist, then a step 240 is performed to determine if an event or condition subsequently occurs to trigger the radio interference reduction state.

Step 240 provides that a call condition is checked to determine whether radio interference control should be switched on at a point during the connected call. As described with FIG. 1, the condition that triggers radio interference control (and thus reduction) may depend on design or implementation. A determination is made in step 260 as to whether the call condition checked in step 240 existed or satisfied some criteria for reducing radio interference. If the call condition does not exist, one embodiment provides that step 240 is performed a duration of time later, in order to see if the call condition occurred. If the call condition does exist, step 270 provides that a radio interference reduction state is implemented. As described with, for example, embodiments of FIG. 4, radio interference reduction may be performed by a processor or other component switching the power state of one or more other components to a low or non-operational power step.

In determining whether the call condition exists to trigger the radio interference reduction state, different embodiments provide for different characteristics, attributes, or parameters to be determined. Furthermore, the characteristics, attributes, and parameters may need to satisfy one or more criteria in order to trigger the radio interference reduction state of step 270. The specific characteristics, attributes, and parameters, and the criteria they satisfy to trigger a radio interference reduction state, are termed a "call condition". In an embodiment, sub-step 244 illustrates that the triggering call condition corresponds to the passage of a designated duration of time. For example, radio interference control may always be performed if no headset or speakerphone is in use (precondition of step 225) and if the connected call lasts longer than 10 seconds.

In another embodiment, sub-step 248 illustrates that the triggering condition may be based at least in part on a determination made about the signal quality of the wireless medium used for the phone call. For example, sub-step 248 may provide for measuring the signal quality, and step 260 determines if the value of the signal quality, or alternatively its rate of degradation over time, indicate the need for radio interference reduction.

Still further, another embodiment provides for sub-step 252, in which the call condition is based at least in part on a signal strength measurement. For example, sub-step 252 may provide for measuring the signal strength, and step 260 determines if the value of the signal strength, or its rate of change, indicate the need for the radio interference reduction state.

In another embodiment, sub-step 256 provides that the call condition may be based at least in part on a value outputted by a proximity sensor. The call condition may thus correspond to a proximity sensor value that is indicative of the mobile computing device being pressed are held near a face or ear of the user. Accordingly, step 260 may correspond to a criteria where the value of the proximity sensor corresponds to a value that estimates the mobile computing device is pressed against the head, face or ear.

While the call condition described with each sub-step of step 240 may be implemented as a separate embodiment, other embodiments may utilize more than one such call condition or sub-step. For example, one embodiment provides for performance of both step 248 and step 252 in determining whether the radio interface control should be implemented. More specifically, radio interference control may be triggered by, for example, only if signal quality is low or degrading (sub-step 248) and by moderate or relatively high signal strength (sub-step 248).

Return of Device State

Radio interference reduction may be lessened by returning the power state of some, but not all components that were switched to low power states as part of the radio interference reduction state implementation (e.g. see step 270). The radio interference reduction state may be eliminated by returning the power state of all components that were switched to the low power state when radio interference reduction was implemented. Given the effect that the radio interference reduction state may have on the functionality of the computing device, embodiments provide for eliminating or mitigating radio interference reduction when it is deemed not necessary, or deemed to be more of a hindrance than benefit to the user. For example, if the user wishes to have the functionality of a component (e.g. the display) at a given instance when the radio interference reduction state is deemed necessary to improve signal quality, it may be desirable to provide the user with the functionality, at the expense of signal degradation.

Once the radio interference reduction state is implemented on a computing device, it may be automatically eliminated (or lessened) with disconnect of the active call. Specifically, once the user hangs up or ends a call, embodiments provide that the components of the computing device return to their normal operational power state. Alternatively, one or more embodiments contemplate that individual components of the computing device return to the power state the component held just before the radio interference reduction state was triggered. For example, if the user had the display turned off or dimmed, upon the active call being ended, the display may remain off, or return to its dimmed state.

One or more embodiments also contemplate terminating or mitigating the radio interference reduction prior to the active call being disconnected. In particular, one or more embodiments contemplate that radio interference reduction state is terminated when conditions exist that indicate the radio interference reduction state is not needed. With regard to embodiments such as described with FIG. 2, once the radio interference reduction state is in effect, it remains in effect until termination of the communication session, or until manual override by the user. The user may manually terminate the radio interference reduction by providing an input to the computing device. The user may, for example, press a key, operate a navigation button, or tap a contact-sensitive display.

Alternatively, one or more embodiments provide for terminating the radio interference reduction state in response to the user terminating a precondition for the radio interference reduction state to exist. With reference to an embodiment of FIG. 2, for example, the user may connect a headset, or switch to speakerphone, both acts that eliminate the precondition. Specifically, when the headset is connected or the speakerphone is on, it becomes likely that the user may wish to operate other functionality of the computing device (as it can no longer be assumed to be pressed against the user's face). When the computing device is held at a distance, it is more likely that the user may wish to view the display, or use the application processor by operating applications etc.

In an embodiment in which the passage of time determines whether radio interference reduction takes place, one or more embodiments provide that the radio interference reduction state may be eliminated or lessened based on the occurrence of one of these events: (i) call termination, (ii) manual override by the user, such as through input, and (iii) termination of a precondition, such as a headset being connected or speakerphone being turned on.

One or more embodiments contemplate that the radio interference reduction state may be eliminated or lessened based on (i) call termination, (ii) manual override by the user, as described above, or (iii) detection of signal attributes that indicate radio interference reduction is not needed. For example, in an embodiment in which signal attributes determine whether radio interference reduction is to take place, a criteria may be established from signal attributes to determine when signal attributes indicate that radio interference reduction can be reduced or eliminated.

FIG. 3 illustrates a method in which radio interference reduction may be eliminated or lessened, based on a criteria established from signal attributes, according to an embodiment of the invention. A method such as described with FIG. 3 may be described with use of elements described with other embodiments described herein. The use of such other elements illustrate suitable components for performing a step or sub-step of a method described.

In step 310, the mobile computing device has a radio interference reduction state implemented, by switching the power state of one or more components that are ancillary to radio-frequency operations (and other operations for cellular/wireless telephony) of the computing device. For example, such a step may correspond to a mobile computing device on which a call is connected, and the user is pressing the device to his head to speak. In such a state, the display of the mobile computing device may be off (or dimmed), and the device may not have full use, at least not without user override. As described with embodiments of FIG. 2, radio interference reduction may be switched on as a result of a call condition being detected. When signal attributes are used, radio interference reduction may be applied with the occurrence of, for example, (i) moderate or high signal strength and low signal quality, or (ii) just low signal quality. As illustrated by an embodiment of FIG. 3, the same signal attributes may be used to terminate the radio interference reduction state of the computing device.

With radio interference reduction on, a determination is made in step 315 as to whether the signal quality is above a given threshold. In one implementation, the signal quality is measured to determine if it has a value of moderate or good quality. As an alternative, the signal quality measurement may correspond to a rate of change. For example, step 315 may make a determination as to the amount that signal quality improves over a set time period is greater than a given threshold.

If the determination in step 315 is that the signal quality measurement (or its rate of change) does not exceed or meet the threshold criteria, then the radio interference reduction step 310 remains in place. However, if the determination in step 315 is that the signal quality measurement does exceed or meet the threshold criteria, then step 320 provides that the signal quality measurement is validated to be independent of the radio interference reduction. Specifically, the radio interference reduction state will typically improve signal quality, and one or more embodiments contemplate that an additional determination of step 320 is made to ensure elimination of the radio interference reduction will not return the signal quality to its degraded or unacceptable state. Accordingly, step 320 provides that a determination is made as to whether the signal strength has increased past a threshold level. If signal strength increases past the threshold level, and signal quality also meets the designated threshold criteria, a conclusion may be made that the elimination of the radio interference reduction state will not cause signal degradation to occur, at least to the extent that radio interference reduction is needed again.

In performing a determination of step 320, one embodiment provides that a comparison may be made between the signal strength level at a time when the criteria of step 315 is satisfied, as compared to a prior instance when signal quality did not satisfy the criteria of step 315. As an alternative or additional criteria, signal strength may satisfy a criteria by its level or value. For example, another criteria for step 320 may be that the signal strength is at a maximum, or near a maximum.

With regard to step 315 or step 320, a timing element may be used as part of the condition or criteria that is to be satisfied with performance of the respective determination. According to one or more embodiments, the signal quality and/or strength may need to exceed a designated threshold duration before radio interference reduction is eliminated or reduced. The time element should be of sufficient duration to measure stability of the radio environment. For example, the environment represented by the signal or strength should remain "good" for some period that indicates stability before any action to eliminate or reduce radio interference reduction is taken. Without use of a timing parameter, the radio interference reduction state may switch numerous times in a given call, causing an undesired "ping-pong" effect.

If the determination in step 320 is not met, then the computing device may maintain the radio interference reduction state of step 310. Later in time, step 315 and/or step 320 may be performed again to see if the radio interference reduction state can be eliminated. Otherwise, step 330 provides that radio interference reduction is eliminated or lessened. For example, the computing device and its components may be returned to their fully powered operation state, or the computing device and its components may be returned to their power state in effect just before the radio interference reduction took place.

While an embodiment of FIG. 3 cites use of signal quality and strength as the attributes, similar methods and techniques for eliminating radio interference reduction may be used with attributes such as signal to noise (Eb/No) or jitter and packet loss.

Hardware Diagram

FIG. 4 illustrates a hardware diagram of a mobile computing device configured according to an embodiment of the invention. A mobile computing device 400 such as shown by FIG. 4 may correspond to a device that is multi-functional, having as at least one primary function, cellular telephonic capabilities. Accordingly, the computing device 400 includes a central processor 420, a power module 440, and a radio subsystem 450. The central processor 420 communicates with: audio system 410, camera 412, Flash memory 414, RAM memory 416, and short range radio module 418 (e.g. Bluetooth or Wireless Fidelity component). The power module 440 powers the central processor 420 and the radio subsystem 450. Other components that communicate with the processor 420 and which are powered by power module 440 include a display 430 (which may be contact-sensitive) and one or more input/output mechanisms (e.g. buttons, keyboards etc.). The power module 440 may correspond to a battery pack (e.g. rechargeable) or a powerline connection or component. Numerous other components and variations are possible to the hardware architecture of the computing device 400, thus an embodiment such as shown by FIG. 4 is just illustrative of one implementation for an embodiment of the invention.

The radio subsystem 450 may include a radio processor 460, a radio memory 462, and a receiver/transmitter 464. While other components may be provided with the radio subsystem 450, the basic components shown provide the ability for the mobile computing device to perform radio-frequency communications, including telephonic communications. In an embodiment, many, if not all, of the components under the control of the central processor 420 are not required by the radio subsystem 450 when a call is connected or ongoing.

The radio processor 460 may communicate with central processor 420 using a serial line 478. In one embodiment, central processor 420 executes logic (by way of programming, code, instructions) corresponding to radio interference control 110 of FIG. 1. Once the determination is made to implement radio interference reduction, central processor 420 may signal selected components to power-down or switch power-states. For example, display 430 may be switched off or dimmed, and camera 412, Flash memory 414, and short-range radio 418 may be switched off. Other components not shown, such as backlighting for a keypad, may also be switched off. These components may be switched off (or have their respective power states altered) because they are ancillary to the operation of the radio subsystem 450. Specifically, the components switched off by central processor 420 may not be needed to maintain an ongoing telephone call over a cellular communication medium. In one implementation, for example, when the radio interference reduction state is implemented, the radio subsystem 450 may remain operational, as may a microphone and speaker (to enable voice communications). But all other components may be either switched off or made to have a lower power state. In one implementation, event the central processor 420 may have its power state lowered so that it performs bare minimum functions for maintaining the call connected.

In another implementation, radio processor 460 may execute some of the radio interference logic and communicate a trigger or command to have central processor 420 implement some or all of the radio interference reduction. Still further, some or all components that are part of the set that are to be switched off as part of the radio interference control may be signaled directly by the processor 460.

In an embodiment in which a timing parameter is used as the call condition that triggers radio interference control, the central processor 420 may maintain, for example, a clock signal. The radio processor 460 may communicate when a call connect happens, and when the clock signal indicates a sufficient passage of time, central processor 420 may implement the radio interference reduction as described above.

In an embodiment in which the call condition that triggers the radio interference control state is based on a criteria derived from signal attributes, the radio processor 460 may communicate signal attribute data 476 to the central processor 420. The receiver/transmitter 464 may be configured to provide signal strength data 472 and signal quality data 474 to the radio processor 460. The signal quality data 474 may be in raw form, at least when provided by the receiver/transmitter 464. In raw form, the signal quality data 474 may correspond to information bits and error code bits. A resulting signal quality value may be based on a determination of a portion of error code bits as compared to the information bits. Either the radio processor 460 or the central processor 420 may determine signal quality from this information. When a cellular call is ongoing, attribute data 476 may continuously (or repeatedly) be communicated to the central processor 420, and contain data corresponding to the signal strength data 472 and the signal quality data 474. While use of signal quality and strength are recited as attributes in FIG. 4, numerous other attributes may be used, such as signal to noise (Eb/No) or jitter and packet loss With further reference to FIG. 4, elimination or mitigation of radio interference reduction may be accomplished through various mechanisms:

Call termination: Radio processor 460 may signal central processor 420 that an ongoing call has terminated. The central processor 420 then signals some or all of the components that were switched when radio interference reduction took place.

User-override: The user may enter input through input/output mechanism 445 (e.g. tapping a key), through display 430 (e.g. tapping contact-sensitive display) or through various other mechanisms. Central processor 420 may register the input and switch the power state of some or all of the components that were signaled when radio interference reduction was implemented.

Elimination or precondition: As mentioned with, for example, an embodiment of FIG. 2, preconditions may be required before radio interference reduction may be implemented. In one implementation, the central processor 420 maintains state information corresponding to the preconditions. For example, the central processor 420 may maintain state information about what devices use the short-range radio port 418, and if the device is a headset, the precondition may be eliminated. In another implementation, a call connect session may cause central processor 420 to execute a phone user-interface that provides the user the ability to select speakerphone functionality. The default status may correspond to no speakerphone, and the user-interface may be needed for the user to switch to speakerphone functions. In doing so, the interaction may be with the central processor 420, which then implements the radio interface reduction.

As mentioned with an embodiment of FIG. 3, signal attributes may also be used to eliminate or mitigate the implementation of the radio interference reduction. Once the radio interference reduction state is implemented, signal attributes of the wireless medium may be analyzed or evaluated to determine if one or more designated criteria is met to remove or mitigate the radio interference reduction state that is implemented on the computing device 400. For example, as described with an embodiment of FIG. 3, the interference state may be switched back if (i) the signal quality improves from a previous degraded level to some threshold amount, and (ii) if the signal strength increases from what it was previous to the improvement in the signal quality. In one embodiment, once the radio interference reduction state is implemented, receiver/transmitter 464 may continue to provide the signal strength 472 and the signal quality 474 signals to the radio processor 460, which forwards data corresponding (either raw or unprocessed) to the central processor 420. In such an embodiment, the central processor 420 may perform an algorithm such as described with FIG. 3, or a variation thereof.

Proximity Sensor

As described with, for example, an embodiment of FIG. 2, a proximity sensor 480 may be incorporated into the mobile computing device to detect the position of the mobile computing device when a call is connected and active. The proximity sensor 480 may be implemented through use of a standard, commercially available component. The proximity sensor 480 may operate by detecting infrared or heat generated from the skin of the user. When a call is connected or in progress, the output 482 from the proximity sensor 480 may include values that indicate that the computing device 400 is pressed against a face or ear. For example, the magnitude of the values may indicate more heat, at least as compared to the case where the device is spaced from the user (e.g. speakerphone is on or headset in). Alternatively, the value of the output 482 may match to a profile that is known to correspond to a user's face, or the value may spike suddenly, indicating sudden presence of skin while the call is active. As such, proximity sensor 480 may be used independent of whether the radio interference reduction state is needed. One embodiment provides that given a certain value of the proximity sensor 480, an assumption can be drawn that the computing device 400 is pressed against a face, or less specifically, not in an open environment where ancillary components of the computing device may be used by the user.

The proximity sensor 480 may communicate the output 482 to either the central processor 420 or the radio processor 460. If to the radio processor 460, one embodiment provides that the radio processor communicates with the central processor 420 to cause implementation of the radio interference reduction state.

When the proximity sensor 480 is used, the radio interference reduction state may be eliminated with the output 482. For example, if the output 482 indicates the computing device 400 is moved away from a face or ear, the radio interference reduction state may be eliminated. This may be applied even if signal quality or other mechanism may be used to implement the radio interference reduction state.

ALTERNATIVE EMBODIMENTS

Numerous variations to details and embodiments described above are possible. For example, while an embodiment of FIG. 4 illustrates a dual processor architecture for use with one or more embodiments of the invention, other embodiments contemplate other hardware architectures, such as a single processor that handles radio operations and controls other components such as illustrated with FIG. 4.

While one or more embodiments contemplate use of the proximity sensor 480, other kinds of sensors may be used to detect a likely position of the computing device when it is in use. For example, a position sensor may detect whether the computing device is upright, and implement the radio interference reduction state when the position of the computing device corresponds to one that is likely to be the user holding the device against the ear.

Furthermore, while embodiments described herein make reference to cellular telephony calls and networks, other embodiments may be implemented on other devices that can be used with radio-frequency, voice-exchange sessions. For example, one or more embodiments may be provided on a standard, handset device that operates under a short range, point-to-point, wireless medium. Embodiments may further apply to a device that communicates short range, radio-frequency communications with an Internet Protocol telephony station. For example, one or more embodiments contemplate a handset or device that communicates using Bluetooth or Wireless Fidelity (WiFi) with a computer that has Internet access. A radio interference control mechanism may be implemented on such a device, similar to described with, for example, embodiments of FIG. 1 and FIG. 2.

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A computing device comprising:
   a radio subsystem comprising one or more radio devices for enabling wireless communications;
   one or more processors coupled to the radio subsystem;
   a radio interference control component (RICC) that is implemented on or with the one or more processors to determine one or more attributes of (i) a wireless communication session, or (ii) a wireless signal used by the radio subsystem during the wireless communication session;
   a set of components that are operated by the one or more processors and which are ancillary to the mobile computing device performing operations for cellular telephony;
   wherein the RICC is capable of signaling, based on the determined one or more attributes, at least one of the one or more processors to reduce radio frequency interference generated from the set of components by reducing a power state of one or more components in the set during the wireless communication session.

2. The computing device of claim 1, wherein the RICC is configured to signal one of the one or more processors to switch off one or more components in the set of components.

3. The computing device of claim 1, wherein the RICC is configured to signal one of the one or more processors are configured to reduce the power state of the set of components only when a duration of the wireless communication session extends past a designated duration.

4. The computing device of claim 1, further comprising a proximity sensor, wherein the proximity sensor communicates an output to the one or more processors, and wherein the one or more processors to reduce the power state of one or more components in the set based at least in part on (i) the output of the proximity sensor, and (ii) the determined attributes.

5. The computing device of claim 1, wherein after the one or more processors reduce radio frequency interference generated by the set of components by reducing the power state of the set of components, the one or more processors detect an event and increase the power state of the set of components in response to detecting the event.

6. The computing device of claim 5, wherein the event includes an event selected from a group consisting of: (i) a speakerphone function being turned on, (ii) a headset being coupled to the computing device, (iii) an increase in the signal quality of the cellular telephony session, and (iv) a combination of an increase in the signal quality of the cellular telephony session and an increase in a signal strength of the cellular telephony session.

7. The computing device of claim 1, further comprising:
a proximity sensor, wherein the proximity sensor communicates an output to at least one of the one or more processors, and wherein the one or more processors reduce the power state of one or more of the components in the set based in part on (i) the determined one or more attributes; and (ii) the output of the proximity sensor having a first value indicating the computing device is proximate to a face of a user, and wherein after the one or more processors reduce radio frequency interference, the one or more processors increase the power state of the set of components based at least in part on the output of the proximity sensor having a second value indicating the computing device is not proximate to the face of the user.

8. The computing device of claim 7, wherein the one or more processors include a radio processor that is part of the radio subsystem, and a central processor, and wherein the central processor signals the set of components to reduce the power state of the set of components.

9. The computing device of claim 1, wherein the one or more determined attributes include a duration of the wireless communication session.

10. The computing device of claim 1, wherein the determined one or more attributes include a quality of the wireless signal.

11. The computing device of claim 1, wherein the determined one or more attributes include a strength of the wireless signal.

12. The computing device of claim 1, wherein the RICC is implemented as logic on one or more of the processors.

13. The computing device of claim 1, wherein the RICC selects which components in the set are to be signaled to reduce their power state based on an anticipated reduction of radio interference with the wireless signal from powering off or down that component.

14. The computing device of claim 1, wherein the wireless communication session corresponds to a wireless telephony session.

15. The computing device of claim 1, wherein the one or more processors are configured to restore the power state of each of the components that have their power state reduced when the wireless communication session takes place.

16. The computing device of claim 1, wherein the one or more processors are capable of reducing the power state of the set of components independent of the computing device being used during a wireless communication session.

* * * * *